United States Patent
Koutsimanis et al.

(10) Patent No.: US 9,794,038 B2
(45) Date of Patent: Oct. 17, 2017

(54) REFERENCE SIGNAL CONFIGURATION

(71) Applicant: Telefonaktiebolaget LM Ericsson (publ), Stockholm (SE)

(72) Inventors: Chrysostomos Koutsimanis, Stockholm (SE); Per Skillermark, Årsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 63 days.

(21) Appl. No.: 14/773,096

(22) PCT Filed: Mar. 22, 2013

(86) PCT No.: PCT/SE2013/050323
§ 371 (c)(1),
(2) Date: Sep. 4, 2015

(87) PCT Pub. No.: WO2014/148961
PCT Pub. Date: Sep. 25, 2014

(65) Prior Publication Data
US 2016/0020877 A1    Jan. 21, 2016

(51) Int. Cl.
*H04L 5/00* (2006.01)
*H04W 88/08* (2009.01)
*H04L 25/02* (2006.01)

(52) U.S. Cl.
CPC ............ *H04L 5/0048* (2013.01); *H04L 5/006* (2013.01); *H04L 5/0023* (2013.01);
(Continued)

(58) Field of Classification Search
CPC ..... H04L 5/0048; H04L 5/0023; H04L 5/006; H04L 5/0094; H04L 5/0096
See application file for complete search history.

(56) References Cited

U.S. PATENT DOCUMENTS

| 2010/0080154 A1* | 4/2010 | Noh ..................... H04B 7/0452 370/310 |
| 2013/0064122 A1 | 3/2013 | Hammarwall et al. |

(Continued)

FOREIGN PATENT DOCUMENTS

| WO | 2010124241 A2 | 10/2010 |
| WO | 2012063131 A1 | 5/2012 |

(Continued)

OTHER PUBLICATIONS

Extended European Search Report dated Nov. 28, 2016 for European Regional Phase Application Serial No. 1 387 8978.9-1851, Regional Phase Entry Date Oct. 1, 2015 consisting of 13-pages.
(Continued)

*Primary Examiner* — Albert T Chou
(74) *Attorney, Agent, or Firm* — Patent Portfolio Builders, PLLC

(57) ABSTRACT

A first and a second communication device and a respective method performed by the first and the second communication device for communicating via radio between the first and the second communication device are provided. The method in the first communication device comprises receiving a first transmission from the second communication device. The method further comprises determining a Reference Signal (RS) configuration based on the received transmissions; and transmitting the RS configuration to the second communication device, the determined RS configuration enabling communication between the first and the second communication device.

16 Claims, 10 Drawing Sheets

(52) U.S. Cl.
CPC .......... *H04L 5/0094* (2013.01); *H04L 5/0096* (2013.01); *H04L 5/0073* (2013.01); *H04L 5/0082* (2013.01); *H04L 5/0085* (2013.01); *H04L 25/0224* (2013.01); *H04W 88/08* (2013.01)

(56) References Cited

U.S. PATENT DOCUMENTS

| | | | | |
|---|---|---|---|---|
| 2014/0254419 A1* | 9/2014 | Chun | ..................... | H04B 7/024 370/252 |
| 2015/0078271 A1* | 3/2015 | Kim | ..................... | H04B 7/0417 370/329 |
| 2015/0312010 A1* | 10/2015 | Urabayashi | ........... | H04W 48/12 370/329 |

FOREIGN PATENT DOCUMENTS

| | | |
|---|---|---|
| WO | 2012095694 A2 | 7/2012 |
| WO | 2012167417 A1 | 12/2012 |
| WO | 2013025144 A1 | 2/2013 |

OTHER PUBLICATIONS

International Search Report and Written Opinion dated Feb. 24, 2014 for International Application Serial No. PCT/SE2014/050323, International Filing Date: Mar. 22, 2013 consisting of 13-pages.

3GPP TSG RAN WG1 Meeting #61, R1-103187, Montreal, Canada, Title: 'LTE-A Dynamic Aperiodic SRS—Triggering, Duration, Timing, and Carrier Aggregation', Agenda Item: 6.5.2.1, Source: Motorola, Document for Discussion and Decision, May 10, 2010 consisting of 4 pages.

3GPP TSG RAN WG1 Meeting #61bis, R1-103932, Dresden, Germany, Title: 'Further Details on LTE-A Aperiodic SRS', Agenda Item: 6.5.2.1, Source: Motorola, Document for Discussion, Jun. 24, 2010 consisting of 5-pages.

3GPP TSG RAN WG1 Meeting #62, R1-104711, Madrid, Spain, Title: 'Further Details on Dynamic Aperiodic SRS', Agenda Item: 6.5.2.1, Source: Motorola, Document for Discussion and Decision, Aug. 23, 2010 consisting of 4-pages.

* cited by examiner

REFERENCE SIGNAL CONFIGURATION

TECHNICAL FIELD

The present disclosure relates to radio communication and in particular to radio communication between a first and a second communication device in a communication system.

BACKGROUND

In radio communication between two devices, the radio channel on which the two devices communicate may not be constant, but instead change dynamically. Further, two different radio channels may individually differ substantially with respect to current conditions of the respective radio channel so that configurations used for a first radio channel may be improper to use for a second radio channel.

In order to cope with the varying conditions, different measures are taken in order to improve the radio performance between the two devices.

Channel and interference estimation play a key role in the overall performance of a network. Through the above estimates, a communication device, such as e.g. a User Equipment, UE, may perform proper signal demodulation and report channel quality level (e.g. Channel Quality Indicator, CQI, to another communication device, such as e.g. a Radio Base Station, RBS. An RBS may be used for doing proper link adaptation (LA). Both channel and interference estimates are derived from a set of Resources Elements (REs) transmitted from the RBS. The density, in frequency and time, of these REs is typically fixed or predetermined and similar for all UEs independent of the current radio channel conditions of each UE. This may lead to excessive overhead by over dimensioning the density of these REs. It may also lead to lower performance due to poor channel estimation due to lack of these REs. For example, if a Resource Signal (RS) pattern is designed to support a high speed scenario, e.g. 300 km/h, then the RS time density is over-dimensioned for a stationary scenario. Furthermore, RS frequency density must cope with high frequency selectivity scenarios, which makes it over-dimensioned for the frequency flat case. In order to cope with these different requirements, some sort of average or good-enough solution may be used. In other words, in order not to waste resources, the density of the REs or RSs may be defined so that the more extreme scenarios, as e.g. a high speed scenario of 300 km/h, may not be supported.

Channel and interference estimation for demodulation and CQI estimates are performed over a set of predetermined dedicated REs, or RSs i.e. REs carrying RSs. In $3^{rd}$ Generation Partnership Project, 3GPP Long Term Evolution, LTE, technology, different releases use different sets of these REs. In LTE Release 8, each RBS transmits a set of REs called Cell-specific RSs (or CRS). CRSs are transmitted regularly in every subframe and occupy 8 REs per resource block, RB per antenna port. The CRSs are cell specific and they can occur in three different frequency shifts. The same pattern is used for all UEs connected to a specific RBS. Among other operations, CRSs are used in demodulation and CQI estimation.

In the demodulation process, channel and noise estimation takes place in three steps. In the first step, CRSs are used to analyse the channel by estimating Doppler frequency, SNR and channel time dispersion. These quantities are then used for defining the filter banks that are used in time and frequency channel filtering. In the second step, estimation of channel on the CRS positions takes place. Based on these estimates, interpolation along frequency and time direction occurs for estimating the channel on all the rest REs. In the final step, noise estimation on the CRS positions takes place. Thus the density of CRSs plays an important role in the performance of channel and interference estimation.

As stated above, in order not to waste too many resources, an operator may choose not to support the more extreme cases by determining a density that will cover at least most of the scenarios likely to occur. One drawback suffered is that resources are wasted for many scenarios where the conditions are better than the worst case which is supported. The fact that reference signal patterns should be designed to support the most challenging scenario in which the network should operate, and support various network operational modes (often vendor proprietary), often results in a reference signal design associated with an unwarranted overhead cost.

SUMMARY

The object is to obviate at least some of the problems outlined above. In particular, it is an object to provide a first communication device and a method performed by the first communication device for communicating via radio with a second communication device. A further object is to provide a second communication device and a method performed by the second communication device for communicating via radio with a first communication device. The respective communication devices and methods enable a dynamic RS configuration to be determined, which RS configuration is to be used for communication between the two communication devices. These objects and others may be obtained by providing a first communication device, a second communication device and a method performed by a first communication device and a method performed by a second communication device according to the appended independent claims.

According to an aspect, a method performed by a first communication device for communicating via radio with a second communication device is provided. The method comprises receiving a first transmission from the second communication device. The method further comprises determining a Reference Signal, RS, configuration based on the received transmission; and transmitting the determined RS configuration to the second communication device, the determined RS configuration enabling communication between the first and the second communication device.

According to an aspect, a method performed by a second communication device for communicating via radio with a first communication device is provided. The method comprises transmitting a first transmission to the first communication device; receiving, from the first communication device, a Reference Signal, RS, configuration determined by the first communication device based on the transmitted first transmission. The method further comprises using the received RS configuration, for communication with the first communication device.

According to an aspect, a first communication device adapted for communicating via radio with a second communication device is provided. The first communication device comprises a receiving unit adapted for receiving a first transmission from the second communication device; and a determining unit adapted for determining a Reference Signal, RS, configuration based on the received transmissions. The first communication device further comprises a transmitting unit adapted for transmitting the determined RS configuration to the second communication device, the determined RS configuration enabling communication between the first and the second communication device.

According to an aspect, a second communication device adapted for communicating via radio with a first communication device is provided. The second communication device comprises a transmitting unit adapted for transmitting a first transmission to the first communication device; and a receiving unit adapted for receiving, from the first communication device, a Reference Signal, RS, configuration determined by the first communication device based on the transmitted first transmission. The second communication device is adapted for using the received RS configuration, for communication with the first communication device.

The first and the second communication devices and the respective methods performed have several advantages. One advantage is that channel and interference estimation may be enhanced with the dynamic and user specific RS configuration patterns. Another advantage is that RS overhead may be minimised by taking into account the radio environment of each user or communication device when the RS pattern is configured, i.e. when determining the RS configuration.

BRIEF DESCRIPTION OF DRAWINGS

Embodiments will now be described in more detail in relation to the accompanying drawings, in which.

DETAILED DESCRIPTION

Briefly described, a first and a second communication device and respective methods performed by them for communicating between them are provided. The first and the second communication devices communicate via a radio channel. In order to communicate over the radio channels, the two communication devices estimate the channel in order to make the communication as good and effective as possible.

Exemplifying embodiments of a method performed by a first communication device for communicating via radio with a second communication device will now be described with reference to FIGS. 1a and 1b.

Figure 1A:
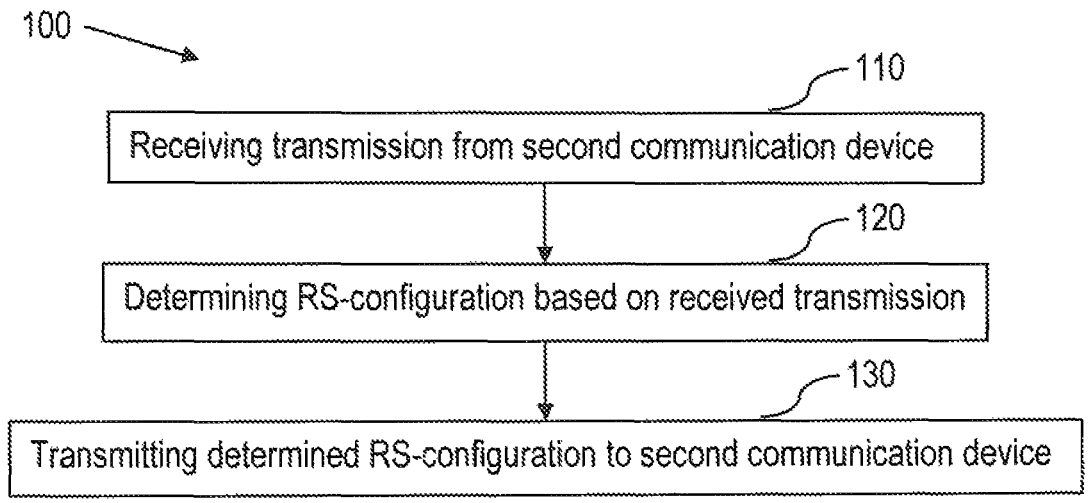
FIG. 1a is a flowchart of a method performed by a first communication device for communicating with a second communication device according to an exemplifying embodiment.

FIG. 1a illustrates the method comprising receiving 110 a first transmission from the second communication device. The method further comprises determining 120 a Reference Signal, RS, configuration based on the received transmissions; and transmitting 130 the determined RS configuration to the second communication device, the determined RS configuration enabling communication between the first and the second communication device.

When the two devices want to communicate with each other over a radio channel, then both devices should know the different characteristics of the radio channel. The characteristics of the radio channel may greatly affect the communication signals being sent from one device to the other device. If the two devices do not know the channel characteristics and adapt the communication signals accordingly, the resulting communication may be of poor quality.

The first communication device receives a first transmission from the second communication device. The first communication devices may perform different measurements or analysis of the received first transmission from the second communication device in order to deduce characteristics of the radio channel. This will be explained in more detail below.

From the measurements or analysis of the received first transmission, the first communication device determines an RS configuration. RSs are used for different purposes. For example, the RSs enable the first and/or the second communication device to estimate the channel quality, interference and so on. The RS configuration is thus determined based on the current conditions of the radio channel, e.g. in order to increase channel estimation quality.

Since the RS configuration is not static, but instead dynamic, the RS configuration, also called RS configuration pattern or RS pattern, may be tailored for the communication between the first and the second communication device. In other words, the RS configuration may be user specific. The RS configuration comprises information of e.g. how many RSs a transmission comprises, and/or where in the transmission the RSs are located. This will be described in more detail below.

Once the first communication device has determined the RS configuration, the first communication device transmits the determined RS configuration to the second communication device.

The determined RS configuration may be employed only in uplink, only in downlink or both in uplink and downlink, i.e. in transmission(s) from the second to the first communication device, in transmission from the first to the second communication device or in both directions. The RSs in the RS configuration will enable communication between the first and the second communication device, channel quality estimation may be increased and also the RSs may enable the receiver of a transmission to correctly demodulate the received transmission.

Since the first communication device may determine the RS configuration for transmission to the second communication device based on the received transmission(s) from the second communication device, this solution can be said to be an open loop embodiment. Generally, in an open loop embodiment, the first communication device makes decision without no explicit recommendation from the second communication device.

The method performed by the first communication device may have several advantages. One advantage is that channel and interference estimation may be enhanced with the dynamic and user specific RS configuration patterns. Another advantage is that RS overhead may be minimised by taking into account the radio environment of each user or communication device when the RS pattern is configured, i.e. when determining the RS configuration.

According to an embodiment, determining 120 the RS configuration comprises estimating a channel characteristic based on the received transmission and selecting the RS configuration based on the estimated channel characteristic.

As described above, the received transmission from the second communication device is used by the first communication device to estimate channel characteristic(s), e.g. channel quality, Doppler frequency, channel time dispersion, etc. From the estimated channel characteristics, the first communication device deduces knowledge of channel which the first communication device uses for selecting an RS configuration, i.e. an RS pattern, which should be employed for communication between the first and the second communication device, either in one transmission direction or in both. The RS configuration is selected to improve the channel condition, such as e.g. improve channel estimation quality.

According to still an embodiment, determining 120 the RS configuration comprises selecting one predefined RS configuration out of at least two predefined RS configurations.

There are in this embodiment a number of predefined RS configurations or RS patterns (at least two) and the first communication device selects one of the predefined RS configurations which is suitable to be used for communication between the first and the second communication device based on the received first transmission, i.e. the estimated channel characteristic(s) or condition(s).

According to still an embodiment, the method further comprises receiving a second transmission from a Radio Base Station, RBS, the second transmission comprising information regarding the second communication device and/or the RBS, wherein determining 120 the RS configuration further is based on the information comprised in the received second transmission. An RBS is a network node e.g. a eNodeB, a eNB, an access point, macro network node, a low power node such as e.g. pico nodes, or a relay or any suitable network node in a communication system.

According to yet an embodiment, determining 120 the RS configuration further is based on parameters specific for the second communication device and/or parameters specific for the operation of the second communication device.

The first communication device may consider other criteria in addition to the estimated channel characteristics when determining the RS configuration. One example is information regarding an RBS. The first communication device receives the second transmission from the RBS and the second transmission comprises information regarding the RBS. The information regarding the RBS may e.g. be an RS configuration used by the RBS.

The information regarding the RBS, e.g. one or more RS configurations currently being used by the RBS may also be used in order to reduce interference between the first communication device and the RBS. For example, the first communication device may determine the RS configuration in such a manner that it has little or minimum overlap with any RS configuration used by the RBS. If the first communication device and the RBS use the same or similar RS configurations, the RSs of the first communication device may interfere with the RSs of the RBS and vice versa.

The second transmission from the RBS may also, or alternatively, comprise information regarding the second communication device. The second communication device may also be communicating with the RBS or may have been communicating with the RBS before the first communication device started communicating with the second communication device. If so, the RBS may be in possession of information regarding the second communication device which the first communication device may take into account when determining the RS configuration to be used.

Examples of information regarding the second communication device are performance in terms of throughput and/or feedback related to Hybrid automatic repeat request, HARQ. Another example is the release version of the communication protocol or standard that is used for the communication that the second communication device supports.

Alternatively, the information regarding the second communication device may be obtained or received by the first communication device from the first received transmission or by retrieving the information from a database or the like with which the first communication device may be able to communicate with.

According to an embodiment, transmitting 130 the determined RS configuration to the second communication device comprises transmitting an index identifying the determined RS configuration in an RS book comprised in the both the first and the second communication device.

The RS book comprises the available different RS configurations that the first communication device may select from. Each entry in the RS book, or individual RS configuration, may be identified by an index. Both the first and the second communication device comprise the RS book. Instead of transmitting the whole RS configuration, the first communication device may simply transmit, to the second communication device, the index identifying the RS configuration that has been determined or selected by the first communication device to be used for communication between the two devices.

In an example, the first communication device is stationary and the second communication device is mobile meaning it can roam or move about. Since the second communication device can roam or move about, it may communicate with a plurality of other devices, e.g. the RBS. In this example, the RS book of the second communication device must comprise at least the same RS configurations as are comprised in the RS book of the first communication device. However, the RS book of the second communication device may comprise more RS configurations than the RS configurations of the RS book of the first communication device. If the respective RS book of the first communication device and the RBS do not comprise the same RS configurations and if the second communication device should be able to communicate with both the first communication device and the RBS, then the RS book of the second communication device must comprise all RS configurations of the respective RS book of both the first communication device and the RBS. Assume the first communication device and the RBS belong to the same communication network. Then an operator of that network may have previously performed some network planning for interference coordination so that some RS configurations are available for the first communication device and some RS configurations are available for the RBS. The second communication device may move about and communicate both with the first communication device and the RBS. Hence the RS book of the second communication device must comprise all RS configurations, i.e. those available to the first communication device and those available to the RBS.

By the first communication device and the RBS not using the same RS configurations, interference between the first communication device and the RBS may be reduced.

In an example, the first communication device comprises an RS book comprising the at least two predefined RS configurations.

As described above, the RS book of the first communication device comprises the possible RS configurations which the first communication device is able to select or determine to be used for communication between the first and the second communication device.

According to yet an embodiment, the method further comprises transmitting 101 a third transmission to the second communication device, enabling the second communication device to determine an RS configuration suitable for use for communication between the first and the second communication device, and receiving 102, from the second communication device, a request to use a RS configuration. The method also comprises determining 120 the RS configuration further based on the received request.

The first communication device transmits the third transmission to the second communication device. Note that even though this transmission is called the "third transmission", this transmission can take place, in time, before the first communication device receives the transmission called the "first transmission". The denotation first, second and third are used in this disclosure to identify the different transmissions and not necessarily to indicate their individual occurrence in time.

By this third transmission, the second communication device is enabled to perform an estimation of the channel in a similar manner as has been described above when the first communication device receives the first transmission from the second communication device, and it will be explained in more detail below.

After the first communication device has transmitted the third transmission to the second communication device, the first communication device receives the request to use a predefined RS configuration out of at least one suggested predefined RS configuration. The request may comprise a plurality, i.e. two or more, RS configurations and the request indicates to the first communication device that the second communication device wishes to use one of the plurality of RS configurations in the request for communication between the two devices. The first communication device may then consider this request when determining the RS configuration to use for communication between the two communication devices.

This procedure may also be referred to as a closed loop solution since it is possible to send the third transmission, receive a request to use a certain RS configuration which is based on the third transmission. In other words, the transmission direction from the first to the second communication device is evaluated and a decision to use a specific RS configuration may then be determined at least partly based on the received request. This embodiment has the advantage that the second communication device is enabled to identify the RS configuration that matches to its radio environment.

Generally speaking, an open loop solution comprises e.g. making a decision regarding a downlink transmission based on a received uplink transmission whereas a closed loop solution comprises making the decision regarding the downlink transmission based on information retrieved with regards to a previous downlink transmission. However, the method described herein is applicable to both transmission direction, to/from the first communication device.

In an example, the RS configuration includes at least one of RS transmit power and precoding, RS density in time, frequency, spatial and code domains and RS mapping in physical layer resources.

The RS configuration may comprise only how many RSs and where in a transmission they are located. For example, in 3GPP LTE which is an Orthogonal Frequency Division Multiplex, OFDM, based radio communication, a resource block comprises a plurality of resource elements. Some of these resource elements may carry data and some may carry RSs. In an example, the RS configuration comprises information of which resource elements carry RSs. The RSs may be transmitted with different transmission power and the transmission power may also be part of the RS configuration. An RS may be transmitted in a precoded fashion or in a non-precoded fashion. The precoding/non-precoding may also be a part of the RS configuration. RS density in time may for example be how often in time the RSs are transmitted.

Hence an RS configuration may comprise a variety of information.

In still an example, determining 120 the RS configuration and transmitting 130 the determined RS configuration to the second communication device is done periodically, non-periodically, in conjunction with a handover procedure, or on demand.

Different factors may affect how often an RS configuration needs to be revised or updated. For example, if both the first and the second communication device are stationary or at least relatively stationary, the RS configuration may not need to be updated very frequently. If one of the communication devices is moving about, and with relatively high speed, the RS configuration may need to be updated frequently. Hence, the frequency with which the RS configuration is updated or revised may be dynamic and determined based on current conditions. The RS configuration may alternatively be updated periodically, e.g. once every second, every minute or every millisecond. The first or the second communication device may detect that the channel conditions have deteriorated and demand/request from the other communication device to update or revise the RS configuration. Assuming e.g. the first communication device being stationary and the second communication device being mobile, the second communication device may be handed over from another communication device (e.g. the RBS) to the first communication device, wherein the first communication device performs the method in response to the handover in order to determine which RS configuration shall be used for communication between the first and the second communication device.

In yet an example, the first communication device is a Radio Base Station, RBS, and the second communication device is a User Equipment, UE.

Such a scenario, i.e. the first and the second communication device being an RBS and UE respectively may be the case when the first communication device is stationary and the second communication device is mobile and may move about and roam between different RBSs.

In another example, determining 120 the RS configuration further is based on a UE specific parameter and/or a Network specific parameter and/or UE operation specific parameter.

As described above, the first communication device (RBS) may obtain or retrieve information regarding the second communication device (UE) and/or another RBS. One example is the reception of the second transmission. The second transmission may be from a neighbouring RBS via an X2 interface in case the radio communication employs Long Term Evolution, LTE. The transmission received from the neighbouring RBS may also be received via a Base Station Controller, BSC, a Radio Network Controller, RNC, or any other node in a radio access network or core network which may convey information from one RBS to another.

Another example is the first communication device retrieving the information from a database or the like, e.g. the RBS receiving information a Home Subscriber Server, HSS, Home Location Register, HLR.

The RBS and the UE thus both comprise the RS book. As described above, the RS book of the UE must comprise all possible RS configurations that are comprised in the RS book of the RBS. It could be that two neighbouring RBSs do not comprise the same RS configurations and if so, the RS book of the UE should comprise all RS configurations that are comprised in the RS books of the RBSs. Of course, all RBSs and all UEs may have the same RS book comprising all possible RS configurations valid for a communication network in which the RBSs are comprised and the UE is employed.

The RS book is used to collect all possible RS combinations or configurations. Each entry in the RS book corresponds to a RS configuration which includes information on the RS signals, for example RS transmission mode (precoded or non-precoded), RS density in time, frequency and antenna ports and RS positions within a resource block, RB. An example of such an RS configuration can be the Common Reference Signals also called the Cell-specific Reference Signals, CRSs, used in $3^{rd}$ Generation Partnership Project, 3GPP, LTE Release 8. The RS book can have multiple entries and the book should be known in both the RBS and the UE. The reason for the latter one is that the UE should know a priori which resource elements carry reference signals in order to properly estimate channel and interference. The RS book can also be generic covering multiple releases (e.g. LTE Release 8-12) and multiple types of RBSs (e.g. Macro nodes, Low power nodes such as e.g. Pico nodes, relays etc).

As described above, the procedure may be implemented in open loop and in closed loop. In open loop, little or limited support from the UE side is provided and a closed loop more support from the UE side is provided, e.g. in the form of explicit feedback from the UE. In the first case, the RBS determines an index of the RS book (in other words the RS configuration/pattern) based on uplink, UL, reference signals transmitted by the UE to the RBS. This procedure takes advantage of the channel reciprocity but for certain properties like Doppler and channel time dispersion it may still be applicable in cases where downlink, DL, and UL channels are in different frequency bands. Furthermore, if interference estimation is needed to determine an appropriate RS configuration/pattern index then the RBS cannot use UL interference measurements in the DL direction since interference in those two directions can differ quite substantially. In the second case, the UE determines at least one index of the RS book based on the DL channel characteristics and the UE signals this index to the RBS. This solution assumes that the UE has the capability (in terms of processing power) to perform some calculations and define the appropriate index for maximizing, or finding a suitable level with regards to, the quality of channel and interference estimation.

Figure 2A:
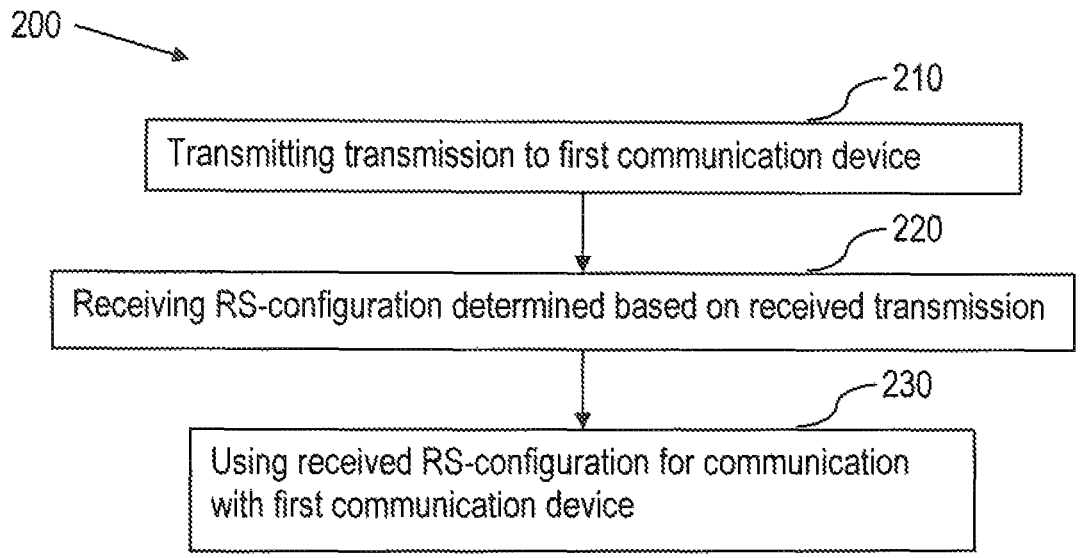
FIG. 2a is a flowchart of a method performed by a second communication device for communicating with a first communication device according to an exemplifying embodiment.

Embodiments herein also relate to a method performed by a second communication device for communicating via radio with a first communication device. Such a method will now be described with reference to FIGS. 2a and 2b. FIG. 2a illustrates the method comprising transmitting 210 a first transmission to the first communication device; receiving 220 a Reference Signal, RS, configuration from the first communication device based on the transmitted first transmission. The method further comprises using 230 the received RS configuration, for communication with the first communication device.

The second communication device transmits the first transmission to the first communication device. As described above in conjunction with FIG. 1a and actions 110 and 120, this first transmission enables the first communication device to determine an RS configuration to be used for communication between the first and the second communication device. Once the first communication device has determined the RS configuration to be used, the first communication device transmits the determined RS configuration to the second communication device. This transmission from the first communication device is received by the second communication device in action 220.

The received RS configuration may be used by the second communication device when transmitting to the first communication device and the received RS configuration may also be used by the second communication device in order to correctly receive subsequent transmissions from the first communication device. In other words, the second communication device uses the received RS configuration for communication with the first communication device.

The method performed by the second communication device has the same or similar advantages as the method performed by the first communication since the first and the second communication devices are performing respective parts of the method in order to communicate with each other. One advantage is that channel and interference estimation may be enhanced with the dynamic and user specific RS configuration patterns. Another advantage is that RS overhead may be minimised by taking into account the radio environment of each user or communication device when the RS pattern is configured, i.e. when determining the RS configuration.

According to an embodiment, the method further comprises receiving 211 a second transmission from the first communication device; determining 212 at least one predefined RS configuration based on the received transmission; and transmitting 215, to the first communication device, a request to use an RS configuration out of the at least one of the determined predefined RS configuration for communication with the first communication device.

As stated before, the naming of the different transmissions, i.e. "first" and "second" do not imply the order in time when the respective transmissions may be received. Instead, the naming of the different transmissions is to separately identify the different transmissions. Hence the second transmission may take place, in time, before the first transmission.

When the second communication device receives the second transmission, the second communication device is enabled to estimate the channel, i.e. channel characteristics, and from that determine one or more RS configurations that may be suitable to use for communication between the two devices, from the second communication device's perspective.

Once the second communication device has determined the one or more RS configurations that are suitable, the second communication device transmits a request to the first communication device. The request comprises the determined RS configurations and the request indicates to the first communication device that the second communication device wishes that one of the RS configurations should be used for communication between the first and the second communication device. The RS configurations may be predefined so that the second communication device simply indicates one or more predefined RS configurations that would be suitable to use from the perspective of the second communication device.

According to still an embodiment, determining 212 the RS configuration comprises estimating 213 a channel characteristics based on the received transmission and selecting 214 at least one predefined RS configuration out of at least two predefined RS configurations based on the estimated channel characteristics.

The determination of the RS configuration is performed in the same or similar manner by the second communication device as by the first communication device. The second communication device estimates the channel characteristics and based on the estimated channel characteristics, the second communication device selects one or more RS configurations that would be suitable to use for communication between the first and the second communication device. Since the decision of which RS configuration to use is taken by the first communication device, the second communication device may select RS configurations in order to optimise performance with regard to the second communication device. The first communication device may then take other criteria into consideration when making the decision which RS configuration to use.

The second communication device may further take other criteria into account for optimising performance with regard to itself. For example, the second communication device may also consider parameters specific for the second communication device in addition to the channel characteristics when determining at least one RS configuration that is suitable, or even optimal, to use from the perspective of the second communication device.

According to yet an embodiment, transmitting 213 the request to use the determined RS configuration to the first communication device comprises transmitting an index identifying the determined RS configuration in an RS book comprised in the both the first and the second communication device.

Both the second and the first communication device comprises or have access to an RS book in which the different RS configurations are represented by an index. As described above, the second communication device may possibly have more RS configurations than the first communication device. In order for the second communication device to not select an RS configuration not supported by the first communication device, the first and the second communication devices have in an example exchanged information so that the second communication device is aware of which RS configurations the first communication device supports. For example, the first communication device may continuously transmit control signals comprising information regarding which indices are comprised in its RS book. This control signalling may be received by the second communication device before or during the setup of the communication between the first and the second communication device. In another example, the first and the second communication device have exchanged information on a peer-to-peer basis before the setup of the communication between the first and the second communication device takes place.

The open loop procedure was briefly described above and will be explained in more detail below. In the explanation below, the first communication device will be denoted RBS and the second communication device will be denoted UE. However, the open loop procedure is not limited to embodiments in which first communication device is an RBS and the second communication device is a UE.

In the open loop mode, each RBS may determine the RS configuration/pattern that should be used for each UE based on the UL channel and several other network specific parameters.

Figure 3:
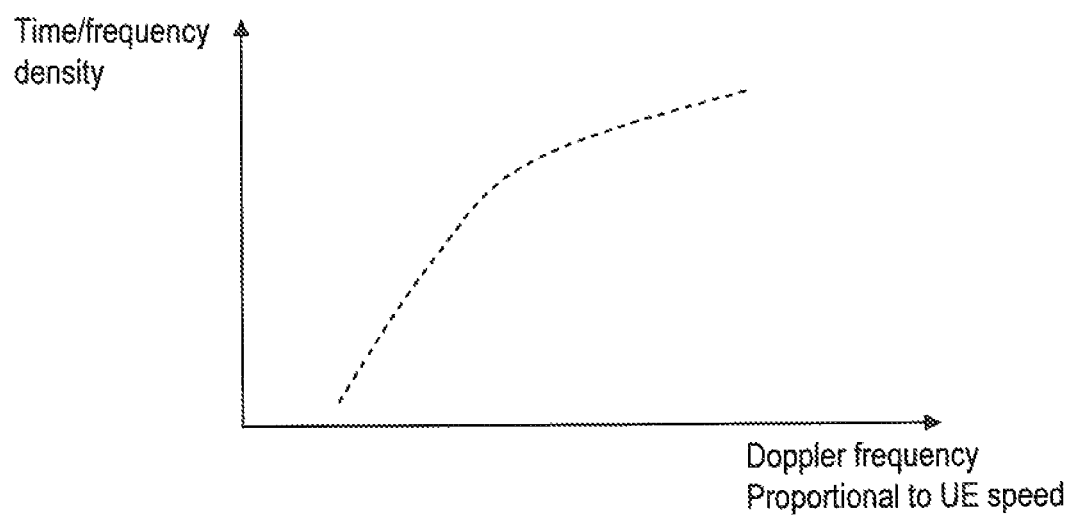
FIG. 3 is a simplified example of a mapping function between Doppler frequency and time/frequency granularity.

During UL transmissions, UEs transmit UL RSs (such as Sounding Reference Signals, SRS, in 3GPP LTE Release 8). Based on these signals, the RBS is enabled to analyse the channel in terms of a number of estimated parameters. Such parameters may include for example, estimate of the Doppler frequency and the time dispersion. These parameters indicate how fast the channel varies in time and frequency domain. Typically, if the channel varies a lot along the frequency dimension for example then a higher number of RSs could be utilised to sample the channel more frequently and perform more accurate channel filtering along the frequency direction. In general, there is a function implemented in the RBS that can map frequency and/or time selectivity to an RS pattern density. Such a function is exemplified in FIG. 3.

Apart from the channel characteristics, the RBS may utilise other parameters in order to calculate the most efficient RS configuration/pattern (or index of RS book) that should be used for a specific UE. These parameters can be UE specific and/or network specific and/or UE operation specific.

An example of a UE specific parameter can be the releases that UE can support. This may be an important parameter in case of backwards compatibility. For example, a 3GPP Release 8 UE can support only specific CRS type of RSs, so the RBS should avoid using any other entry in the RS book. For example, in case of only LTE Release 8 terminals, RBSs can still be enhanced with an RS book. The entries of the book correspond to the standardized LTE Release 8 CRS configurations. Then RBSs may coordinate the configuration of those CRS patterns or configurations by exchanging the corresponding indices to the RS book and hence optimising network performance (sort of Self Organising Network, SON, feature). Another example of UE specific parameter is the UE performance in terms of throughput and/or feedback related to HARQ processes. For example, a consecutive number of failed transmissions may trigger the RBS to switch to an RS configuration that can provide more robust channel and interference estimation. This is another example of when the method is performed non-periodically and on demand.

An example of network specific parameter is the average cell load, i.e. the load of the RBS. For example, if the cell load is low so the available data resources are underutilised, then the RBS may decide to increase the reuse of RSs in order to improve quality of channel and interference estimation. This extra overhead will not harm UE throughput since the predefined data resource elements were not fully utilised. Another example of network specific parameter, available at RBS, is the scheduler decision which indicates which resource blocks are used for a specific transmission to a UE. This indication can be utilised to avoid assigning RSs in resource blocks that are not scheduled. Another example of network specific parameter is an inter-cell interference indication. This indication may be based on inter-cell interference estimation provided by the UE or signalling of cell load among cells or RBSs (e.g. in 3GPP LTE Release 8 a high interference indicator HII over X2 interface has been standardised). If inter-cell interference is high, then the RBS may utilise for example another RS configuration which is subjective to lower inter-cell interference (e.g. in 3GPP LTE Release 8 a shifted CRS option may be used). Another alternative is that the RBS selects an index to an RS configuration with higher time and/or frequency density (more resource elements to be averaged). Yet another alternative is that the RBS selects an index to an RS configuration with precoded RSs in order to boost the RSs quality (higher Signal to Interference and Noise Ratio, SINR, on these resource elements).

An example of UE operation may be on what is the purpose of using RSs. Among others, such UE operation includes demodulation and Channel Quality Indicator, CQI, feedback. For example, the RBS may select different index of the RS book depending on which process the RSs are going to be used for the same UE (e.g. in 3GPP LTE Release 10 Demodulation Reference Signals, DMRSs, are used for channel estimation for demodulation but Channel State Information, CSI,-RSs are used for channel estimation for CQI).

Based on the above parameters, both channel and network dependent, each RBS may select an appropriate RS configuration which maximises or minimises a certain utility function. The utility function may be expressed in many different terms, such as the experienced UE throughput, the RBS energy consumption and the inter-cell interference among others. For example, an RBS may select the RS configuration that provides the most robust channel and interference estimation while still keeping the RS overhead low, targeting thus in maximising the UE throughput. Another example is that an RBS may select the RS configuration that provides the least unnecessary RS transmissions thus targeting at a low energy consumption solution. Finally, an RBS may select the RS configuration that produces the lowest inter-cell interference by means of shifting RSs in time and/or frequency and/or reducing RS density thus helping transmissions in other nodes/RBSs and increasing network capacity.

The last step includes signalling of the above index and/or indices to the connected UEs. Then each UE is informed on when and which resource elements are used as RSs (or carry RSs) by simply reading the configuration that corresponds to the received index. Furthermore, the RS index and/or indices can be signalled to neighbour RBSs utilising the same RS-book based idea. This may allow RS pattern/configuration coordination among multiple RBSs and thus multi-cell RS pattern/configuration optimisation. The above process may occur either in a periodic or non periodic way. In the first case, each RBS reconfigures the RS pattern for each UE in predetermined cycles, the duration of each can be configured by upper layers (e.g. Radio Resource Control, RRC, in case of LTE). In the second case, each RBS may reconfigure the RS pattern in an ad hoc way. For example, reconfiguration may be performed in response to a request for RS reconfiguration received from the UE, noticeable change in the network specific parameters (e.g. the load of a neighbour cell/RBS has changed drastically) and poor UE performance (e.g. the number of HARQ retransmissions has increased) among others.

In the closed loop mode, each UE determines a potential RS configuration or pattern that should be used for channel and interference estimation based on the DL channel. Since, the UE might be unaware of network conditions, signals the preferred index or indices to the RBS and then the RBS may perform the final selection of the RS configuration to be used. That means that the RBS can overwrite the index recommendation from the UE or may further elaborate the UE recommendation by selecting an appropriate RS configuration out of all recommended ones.

Similar to the open loop, the RS configuration selection may be based on channel parameters and/or UE specific and/or network specific and/or UE operation specific parameters. The difference with the open loop mode is that some of the above parameters are available and may be used only in the RBS and some others are available and may be used only in the UE. Specifically, channel parameters, UE specific parameters and UE operation parameters may be used for selecting the appropriate RS pattern in the UE. In order to perform the initial channel estimation, a baseline RS configuration is assumed. This may be hardcoded to a specific entry of the RS book and signalled to the UE with other system parameters.

In addition, network specific parameters may be used at the RBS for correcting further the proposed RS configuration from the UE. For example, the UE may determine the frequency and/or time density of the RSs while the RBS may determine the configuration with the proposed time/frequency density which produces as much less as possible interference to neighbour cells (e.g. in 3GPP LTE release 8 by selecting one of the available CRS shifts).

Finally, each RBS signals the determined index to the connected UE(s). The configuration process may be made either periodically or non-periodically similar to the open loop mode.

Figure 4A:
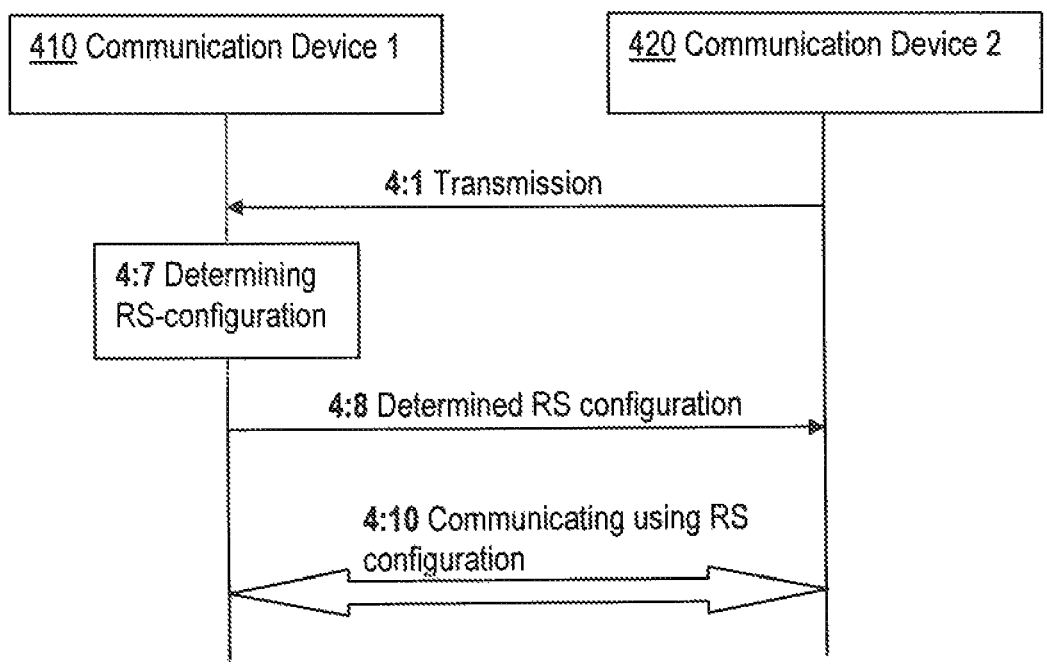
FIG. 4a is a signalling diagram of an exemplifying procedure for communicating between a first and a second communication device.

FIG. 4a is a signalling diagram of an exemplifying procedure for communicating between a first and a second communication device. FIG. 4a illustrates the first communication device 410 receiving 4:1 a first transmission from the second communication device 420. The first communication device 410 analyses the received first transmission and 4:7 determines an RS configuration to be used (at least by the second communication device) for communication between the two communication devices 410 and 420. The RS configuration may be used by the second communication device either to receive transmissions from the first communication device, to transmit transmission to the first communication device or both. FIG. 4a further illustrates the first communication device 410 transmitting 4:8 the determined RS configuration to the second communication device 420. The determined RS configuration may then be used for communication 4:10 between the first and the second communication device, in either or both directions.

Figure 4B:
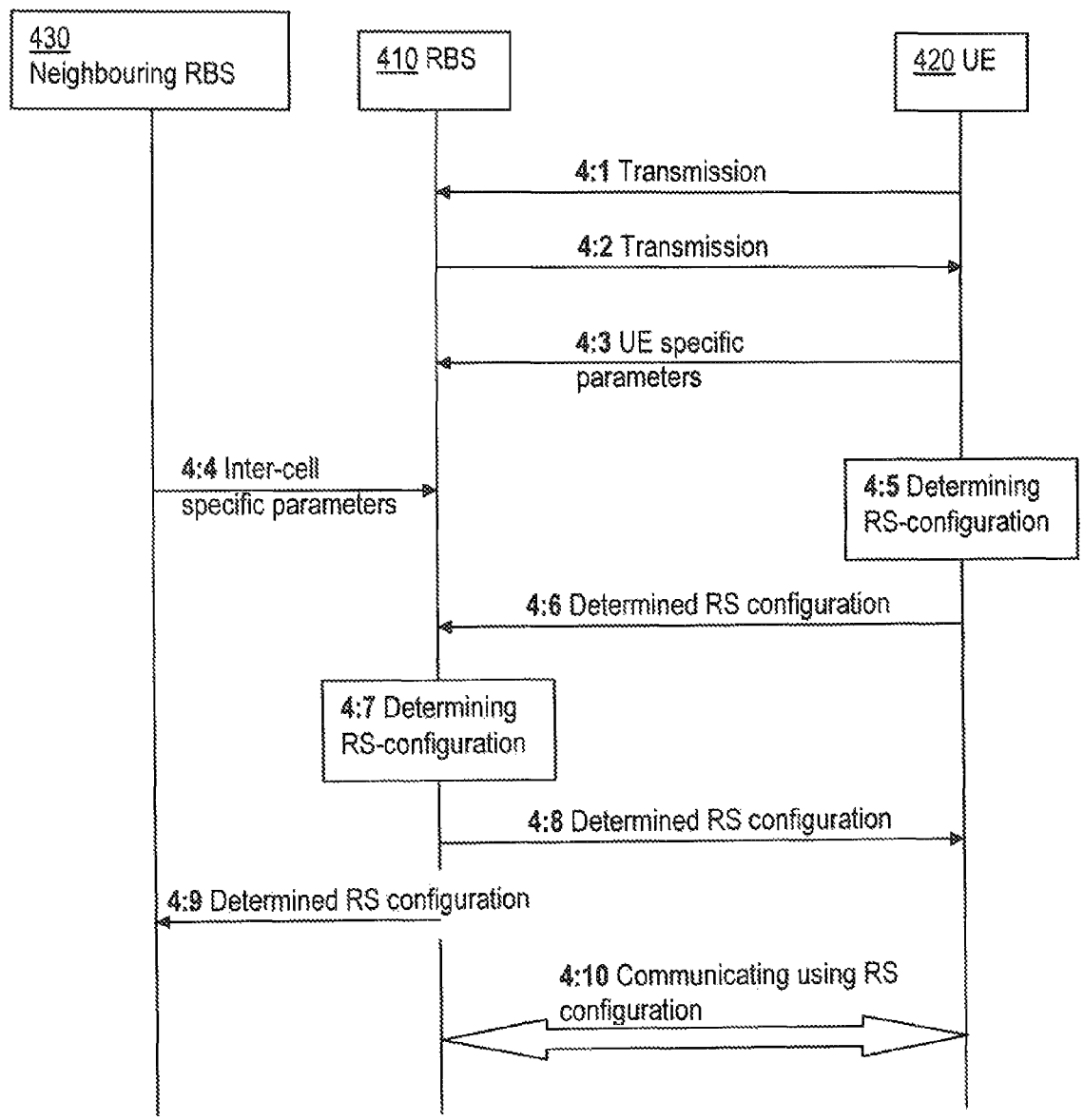
FIG. 4b is a signalling diagram of yet an exemplifying procedure for communicating between a first and a second communication device.

FIG. 4b is a signalling diagram of yet an exemplifying procedure for communicating between a first communication device, UE, and a second communication device, RBS. FIG. 4b illustrates the RBS 410 receiving 4:1 a first transmission from the UE 420 and transmitting 4:2 a second transmission to the UE 420.

FIG. 4b also illustrates the RBS 410 receiving 4:3 a third transmission from the UE 420 comprising UE specific parameters. The RBS 410 also receives 4:4 a forth transmission from a neighbouring RBS 430 comprising inter-cell, or inter-RBS, specific parameters. The UE 420 analyses the received second transmission and based on this transmission, the UE 420 determines 4:5 at least one RS configuration that is suitable, or even optimal, to use for communication with the RBS from the UE point of view. The UE 420 then transmits 4:6 the determined at least one RS configuration to the RBS 410 in a request to use one of the at least one determined RS configuration.

The RBS 410 may analyse and estimate the radio channel based on the first received transmission, 4:1. The RBS 410 now has information regarding the analysed or estimated channel, at least one RS configuration that the UE 420 wishes to use, UE specific parameters and inter-cell specific parameters. The RBS 410 then determines 4:7 an RS configuration to use for communication between the RBS 410 and the UE 420 based on at least one piece of information listed above, that is based on at least one of the analysed or estimated channel, at least one RS configuration that the UE 420 wishes to use, UE specific parameters and inter-cell specific parameters.

The RBS 410 then transmits 4:8 the determined RS configuration to the UE 420. The UE 420 and the RBS 410 use the determined configuration for 4:10 communicating between the UE 420 and the RBS 410. The RBS 410 then transmits 4:9 the determined RS configuration to the neighbouring RBS 430.

Embodiments herein also relate to a first communication device adapted for communicating via radio with a second communication device. The first communication device has the same technical features, objects and advantages as the method performed by the first communication device as described above. The first communication device will only be described in brief in order to avoid unnecessary repetition.

Figure 5:
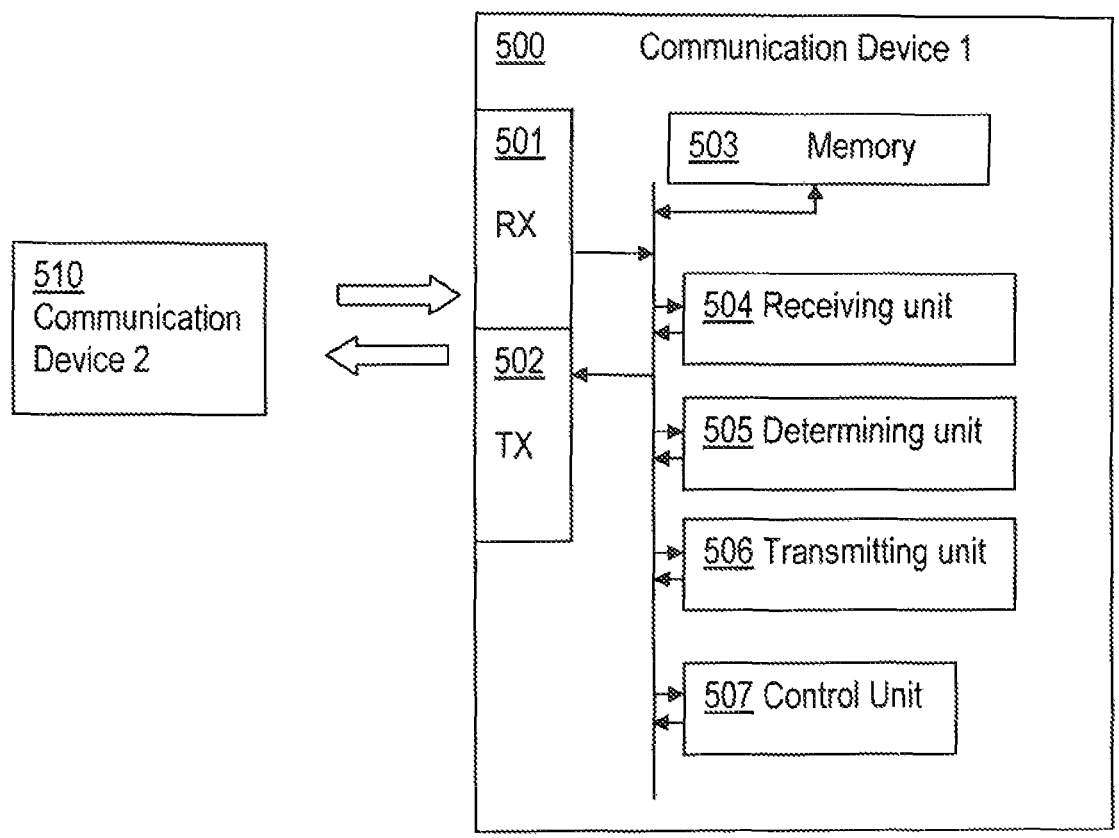
FIG. 5 is a block diagram of a first communication device adapted for communication with a second communication device according to an exemplifying embodiment.

FIG. 5 is a block diagram of a first communication device adapted for communication with a second communication device according to an exemplifying embodiment. FIG. 5 illustrates the first communication device comprising a receiving unit 504 adapted for receiving a first transmission from the second communication device; and a determining unit 505 adapted for determining a Reference Signal, RS, configuration based on the received transmissions. The first communication device further comprises a transmitting unit 506 adapted for transmitting the determined RS configuration to the second communication device, the determined RS configuration enabling communication between the first and the second communication device.

The first communication device has the same advantages as the method performed by the first communication device. One advantage is that channel and interference estimation may be enhanced with the dynamic and user specific RS configuration patterns. Another advantage is that RS overhead may be minimised by taking into account the radio environment of each user or communication device when the RS pattern is configured, i.e. when determining the RS configuration.

According to an embodiment, the determining unit 505 is adapted for determining the RS configuration by estimating a channel characteristic based on the received transmission and selecting the RS configuration based on the estimated channel characteristic.

According to still an embodiment, the determining unit (505) is adapted for determining the RS configuration by selecting one predefined RS configuration out of at least two predefined RS configurations.

According to yet an embodiment, the receiving unit 504) further is adapted for receiving a second transmission from an RBS the second transmission comprising information regarding the second communication device and/or the RBS, wherein determining unit 505 is adapted for determining the RS configuration further based on the information comprised in the received second transmission.

According to another embodiment, the determining unit 505 is adapted for determining the RS configuration further based on parameters specific for the second communication device and/or parameters specific for the operation of the second communication device.

According to still another embodiment, the transmitting unit 506 is adapted for transmitting the determined RS configuration to the second communication device by transmitting an index identifying the determined RS configuration in an RS book comprised in the both the first and the second communication device.

In an example, the first communication device comprises an RS book comprising the at least two predefined RS configurations.

According to yet an embodiment, the transmitting unit 506 is adapted for transmitting a third transmission to the second communication device enabling the second communication device to determine an RS configuration suitable for use for communication between the first and the second communication device, and the receiving unit 504 is adapted for receiving from the second communication device, a request to use a predefined RS configuration, wherein the determining unit 505 is further adapted for determining the RS configuration based on the received request.

In an example, the RS configuration includes at least one of RS transmit power and precoding, RS density in time, frequency, antenna ports, RS positions within a Resource Block, RB, spatial and code domains and RS mapping in physical layer resources.

In yet an example, the determining unit 505 is adapted for determining the RS configuration periodically, non-periodically, in conjunction with a handover procedure, or on demand and the transmitting unit 506 is adapted for transmitting the determined RS configuration to the second communication device periodically, non-periodically, in conjunction with a handover procedure, or on demand.

In still an example, the first communication device is an RBS and the second communication device is a UE.

In another example, the determining unit 505 is adapted for determining the RS configuration further based on a UE specific parameter and/or a network specific parameter and/or UE operation specific parameter.

Embodiments herein also relate to a second communication device adapted for communicating via radio with a first communication device. The second communication device has the same technical features, objects and advantages as the method performed by the second communication device as described above. The second communication device will only be described in brief in order to avoid unnecessary repetition.

Figure 6:
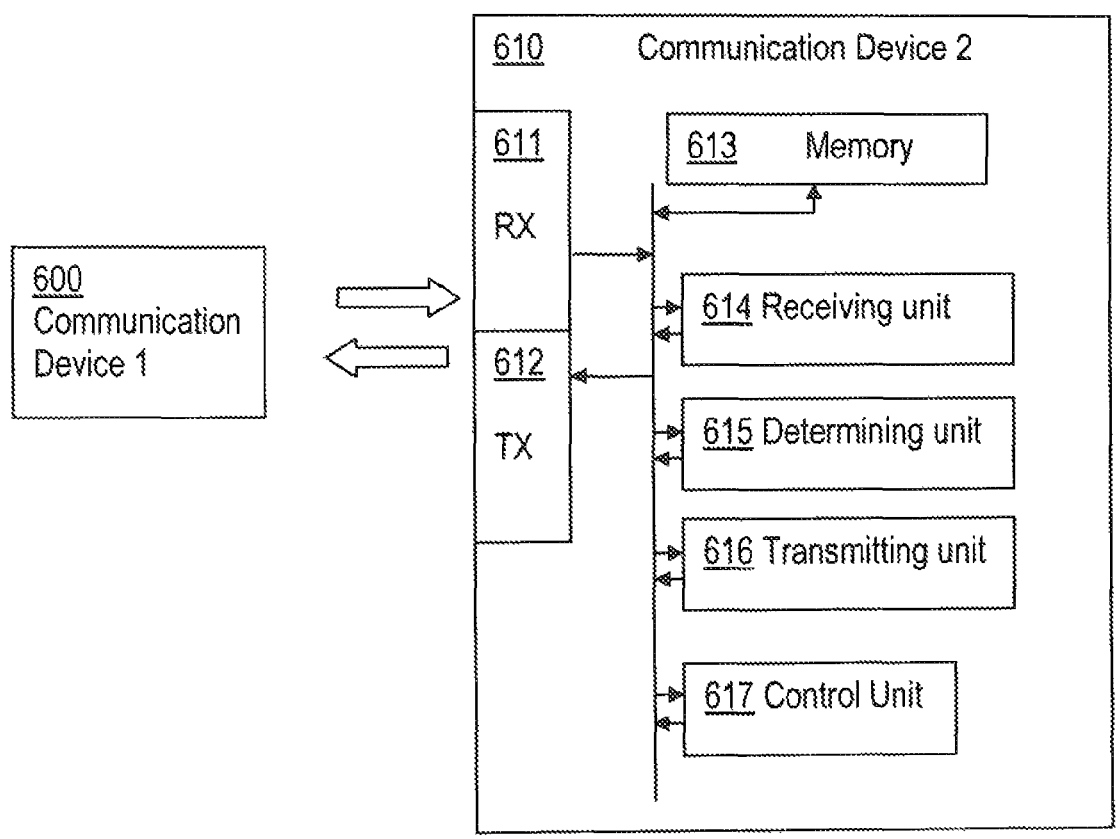
FIG. 6 is a block diagram of a second communication device adapted for communication with a first communication device according to an exemplifying embodiment.

FIG. 6 is a block diagram of a second communication device adapted for communication with a first communication device according to an exemplifying embodiment. FIG. 6 illustrates the second communication device comprising a transmitting unit 616 adapted for transmitting a first transmission to the first communication device; and a receiving unit 614 adapted for receiving a Reference Signal, RS, configuration from the first communication device based on the transmitted first transmission. The second communication device 610 is adapted for using the received RS configuration, for communication with the first communication device.

The second communication device has the same advantages as the method performed by the second communication device. One advantage is that channel and interference estimation may be enhanced with the dynamic and user specific RS configuration patterns. Another advantage is that RS overhead may be minimised by taking into account the radio environment of each user or communication device when the RS pattern is configured, i.e. when determining the RS configuration.

According to an embodiment, the receiving unit 614 further is adapted for receiving a second transmission from the first communication device, the second communication device further comprising a determining unit 615 adapted for determining at least one predefined RS configuration based on the received transmission, wherein the transmitting unit 616 further is adapted for transmitting to the first communication device, a request to use an RS configuration out of the at least one of the determined predefined RS configuration for communication with the first communication device.

According to still an embodiment, the determining unit 615 further is adapted for determining the RS configuration by estimating a channel characteristic based on the received transmission and selecting at least one predefined RS configuration out of at least two predefined RS configurations based on the estimated channel characteristic.

According to yet an embodiment, the transmitting unit 616 further is adapted for transmitting the request to use the determined RS configuration to the first communication device by transmitting an index identifying the determined RS configuration in an RS book comprised in the both the first and the second communication device.

The RS configuration may e.g. include at least one of RS transmit power and precoding, RS density in time, frequency, antenna ports, RS positions within a Resource Block, RB, spatial and code domains and RS mapping in physical layer resources.

Figure 7A:
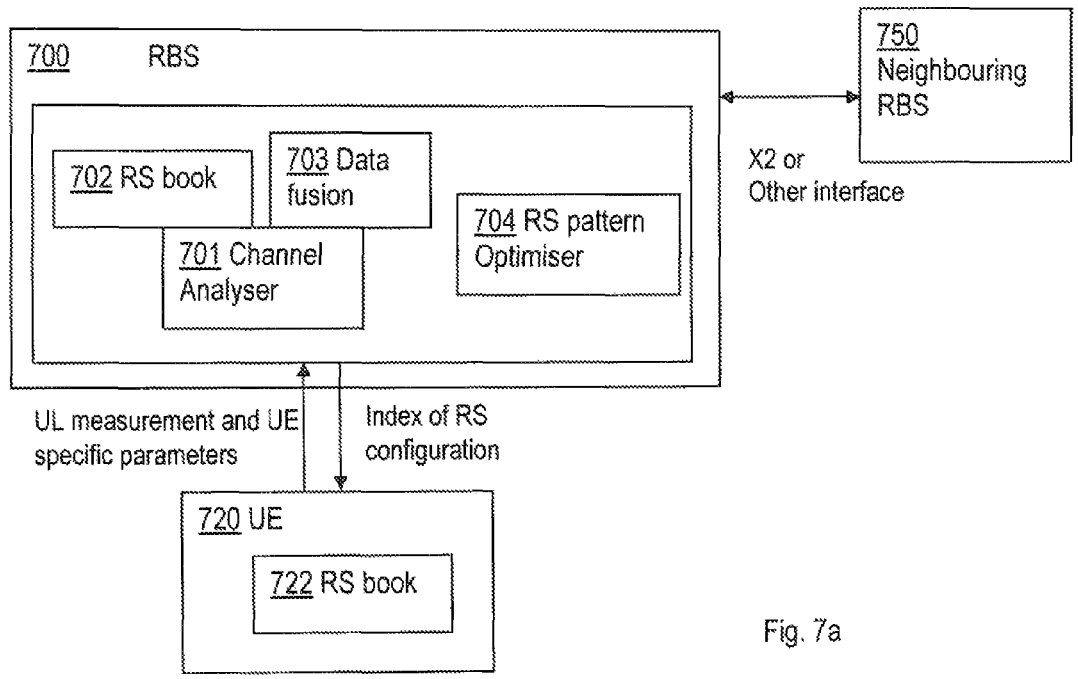
FIG. 7a is a block diagram of an RBS and a UE schematically illustrating an open loop implementation.

FIG. 7a is a block diagram of an RBS and a UE schematically illustrating an open loop implementation.

FIG. 7a illustrates the RBS 700 and the UE 720 both comprising an RS book 702 and 722 respectively. As described above, they may be identical or the RS book 722 of the UE 720 must comprise at least all the RS configurations and indices as the RS book 702 of the RBS 700. The RBS 700 also comprises a data fusion unit 703 which is adapted to process all input parameters. The RBS 700 further comprises an RS-pattern optimiser 704 which optimally selects an RS configuration based on e.g. the estimated channel. The channel is estimated by a channel analyser 701, comprised in the RBS 700. The UE 720 may thus transmit a transmission to the RBS 700, the RBS 700 analysis and estimates the channel by means of the channel analyser 701. The RBS 700 may also receive information (as described above) from a neighbouring RBS 750. Based on the result from the channel analyser 701 and optionally also information received from the neighbouring RBS 750, the RS pattern optimiser 704 and the data fusion unit 703 determines an RS configuration from at least two RS configuration comprised in the RS book 702 of the RBS 700 to be used for communication between the RBS 700 and the UE 720. The RBS 700 transmits an index of the RS book 702 to the UE 720 and the UE 720 retrieves the RS configuration to use by consulting its own RS book 722 with the help of the received index.

Figure 7B:
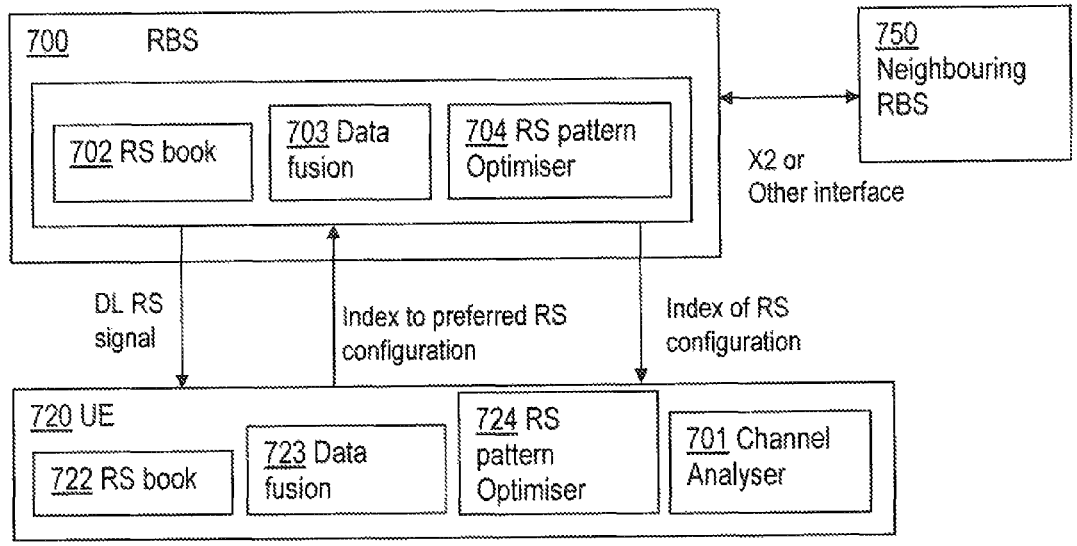
FIG. 7b is a block diagram of an RBS and a UE schematically illustrating a closed loop implementation.

FIG. 7b is a block diagram of an RBS and a UE schematically illustrating a closed loop implementation. The RBS 700 is enhanced or equipped with an RS book 702 and an RS-pattern optimiser 704 which optimally selects an RS configuration. The UE 720 is enhanced with similar functionalities that allow estimating an index to a preferred RS pattern or configuration as previously described.

In FIG. 5, the first communication device 500 is also illustrated comprising a receiving unit 501 and a transmitting unit 502. Through these two units, the first communication device 500 is adapted to communicate with other nodes and/or entities in the wireless communication network. The receiving unit 501 may comprise more than one receiving arrangement. For example, the receiving unit may be connected to both a wire and an antenna, by means of which the first communication device 500 is enabled to communicate with other nodes and/or entities in the wireless communication network. Similarly, the transmitting unit 502 may comprise more than one transmitting arrangement, which in turn are connected to both a wire and an antenna, by means of which the first communication device 500 is enabled to communicate with other nodes and/or entities in the wireless communication network. The first communication device 500 further comprises a memory 503 for storing data. Further, the first communication device 500 is illustrated comprising a control or processing unit 507 which in turns is connected to the different units 503-506. It shall be pointed out that this is merely an illustrative example and the first communication device 500 may comprise more, less or other units or modules which execute the functions of the first communication device 500 in the same manner as the units illustrated in FIG. 5.

It should be noted that FIG. 5 merely illustrates various functional units in the first communication device 500 in a logical sense. The functions in practice may be implemented using any suitable software and hardware means/circuits etc. Thus, the embodiments are generally not limited to the shown structures of the first communication device 500 and the functional units. Hence, the previously described exemplary embodiments may be realised in many ways. For example, one embodiment includes a computer-readable medium having instructions stored thereon that are executable by the control or processing unit 507 for executing the method steps in the first communication device 500. The instructions executable by the computing system and stored on the computer-readable medium perform the method steps of the first communication device 500 as set forth in the claims.

In FIG. 6, the second communication device 610 is also illustrated comprising a receiving unit 611 and a transmitting unit 612. Through these two units, the second communication device 610 is adapted to communicate with other nodes and/or entities in the wireless communication network. The receiving unit 611 may comprise more than one receiving arrangement. For example, the receiving unit may be connected to both a wire and an antenna, by means of which the second communication device 610 is enabled to communicate with other nodes and/or entities in the wireless communication network. Similarly, the transmitting unit 612 may comprise more than one transmitting arrangement, which in turn are connected to both a wire and an antenna, by means of which the second communication device 610 is enabled to communicate with other nodes and/or entities in the wireless communication network. The second communication device 610 further comprises a memory 613 for storing data. Further, the second communication device 610 is illustrated comprising a control or processing unit 617 which in turns is connected to the different units 613-616. It shall be pointed out that this is merely an illustrative example and the second communication device 610 may comprise more, less or other units or modules which execute the functions of the second communication device 610 in the same manner as the units illustrated in FIG. 6.

It should be noted that FIG. 6 merely illustrates various functional units in the second communication device 610 in a logical sense. The functions in practice may be implemented using any suitable software and hardware means/circuits etc. Thus, the embodiments are generally not limited to the shown structures of the second communication device 610 and the functional units. Hence, the previously described exemplary embodiments may be realised in many ways. For example, one embodiment includes a computer-readable medium having instructions stored thereon that are executable by the control or processing unit 617 for executing the method steps in the second communication device 610. The instructions executable by the computing system and stored on the computer-readable medium perform the method steps of the second communication device 610 as set forth in the claims.

Figure 8:
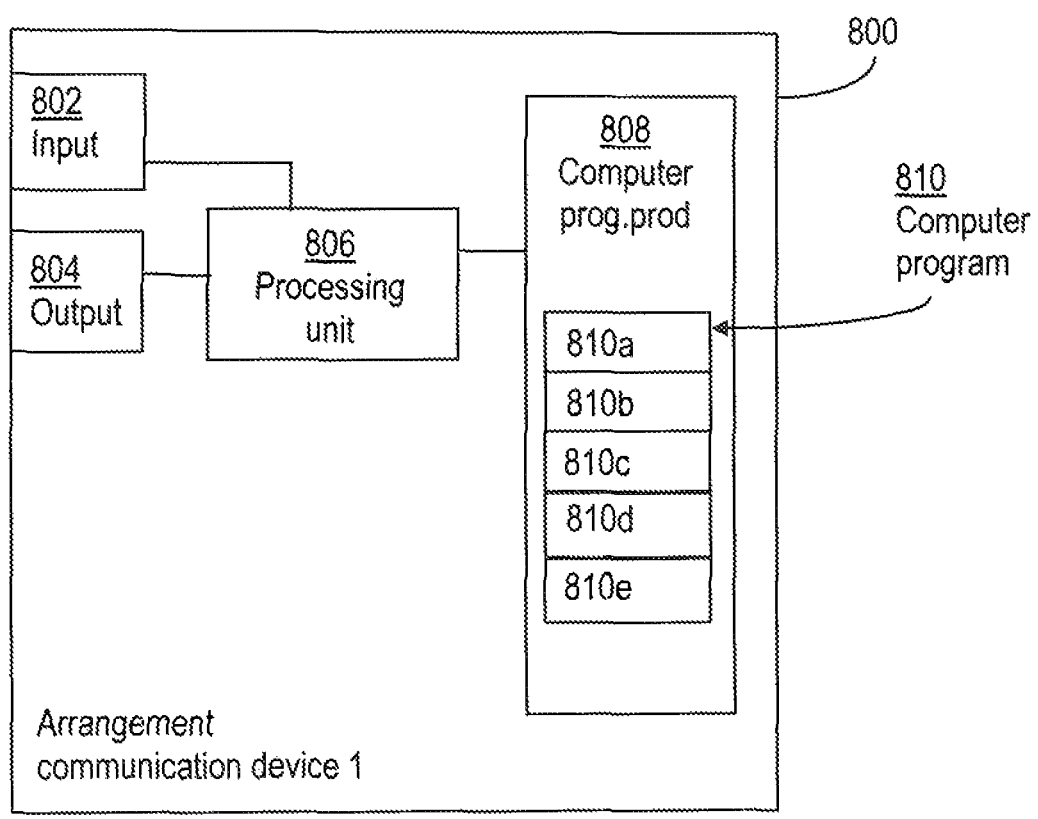
FIG. 8 is a block diagram of an arrangement in a first communication device adapted for communication with a second communication device according to an exemplifying embodiment.

FIG. 8 is a block diagram of an arrangement in a first communication device adapted for communication with a second communication device according to an exemplifying embodiment.

FIG. 8 schematically shows an embodiment of an arrangement in a first communication device 800. Comprised in the arrangement in the first communication device 800 are here a processing unit 806, e.g. with a DSP (Digital Signal Processor). The processing unit 806 may be a single unit or a plurality of units to perform different actions of procedures described herein. The arrangement in the first communication device 800 may also comprise an input unit 802 for receiving signals from other entities, and an output unit 804 for providing signal(s) to other entities. The input unit and the output unit may be arranged as an integrated entity or as illustrated in the example of FIG. 5, as one or more interfaces 501/502.

Furthermore, the arrangement in the first communication device 800 comprises at least one computer program product 808 in the form of a non-volatile memory, e.g. an EEPROM (Electrically Erasable Programmable Read-Only Memory), a flash memory and a hard drive. The computer program product 508 comprises a computer program 810, which comprises code means, which when executed in the processing unit 806 in the arrangement in the first communication device 800 causes the arrangement in the first communication device 800 to perform the actions e.g. of the procedure described earlier in conjunction with FIGS. 1*a* and 1*b*.

The computer program 810 may be configured as a computer program code structured in computer program modules 810*a*-810*e*. Hence, in an exemplifying embodiment, the code means in the computer program of the first communication device 800 comprises a receiving unit, or module, for receiving a first transmission from the second communication device. The computer program further comprises a determining unit, or module, for determining a Reference Signal, RS, configuration based on the received transmissions. The computer program further comprises a transmitting unit, or module, for transmitting the determined RS configuration to the second communication device, the determined RS configuration enabling communication between the first and the second communication device.

Figure 1B:
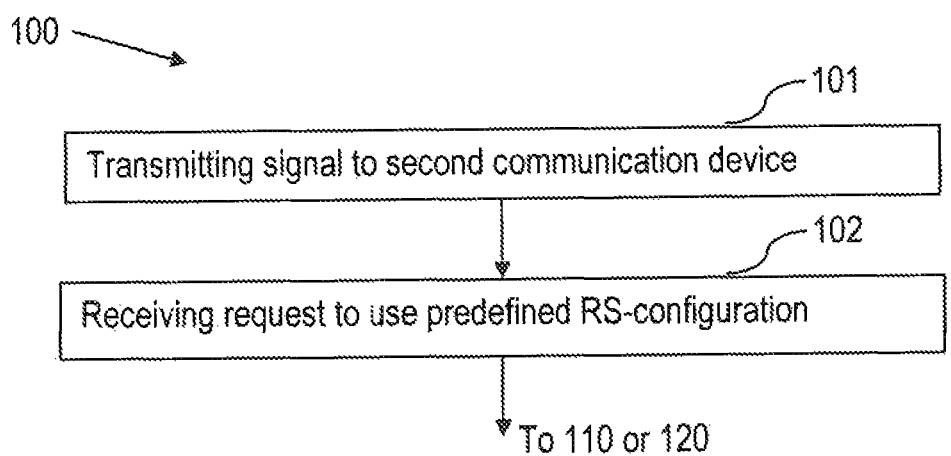
FIG. 1b is a flowchart of a method performed by a first communication device for communicating with a second communication device according to still an exemplifying embodiment.

The computer program modules could essentially perform the actions of the flow illustrated in FIGS. 1*a* and 1*b*, to emulate the first communication device 800. In other words, when the different computer program modules are executed in the processing unit 806, they may correspond to the units 504-506 of FIG. 5.

Figure 9:
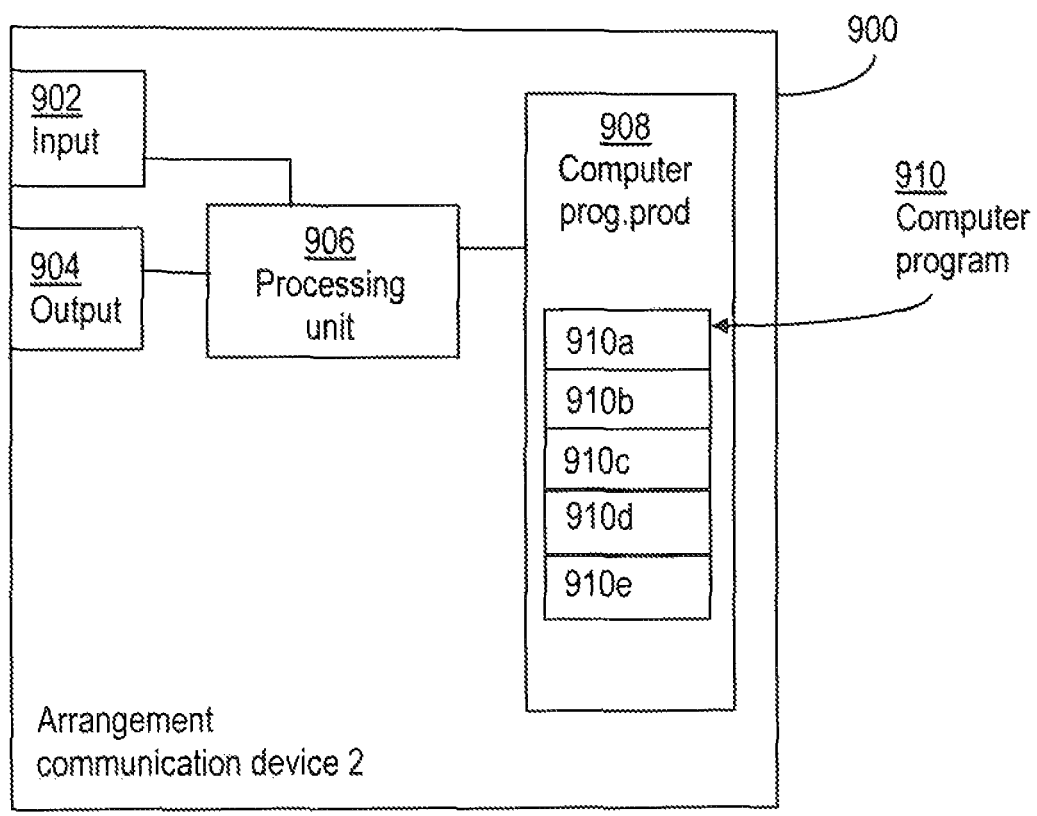
FIG. 9 is a block diagram of an arrangement in a second communication device adapted for communication with a first communication device according to an exemplifying embodiment.

FIG. 9 is a block diagram of an arrangement in a second communication device adapted for communication with a first communication device according to an exemplifying embodiment.

FIG. 6 schematically shows an embodiment of an arrangement in a second communication device 900. Comprised in the second communication device 900 are here a processing unit 906, e.g. with a DSP (Digital Signal Processor). The processing unit 906 may be a single unit or a plurality of units to perform different actions of procedures described herein. The arrangement in the second communication device 900 may also comprise an input unit 902 for receiving signals from other entities, and an output unit 904 for providing signal(s) to other entities. The input unit and the output unit may be arranged as an integrated entity or as illustrated in the example of FIG. 6, as one or more interfaces 611/612.

Furthermore, the arrangement in the second communication device 900 comprises at least one computer program product 908 in the form of a non-volatile memory, e.g. an EEPROM (Electrically Erasable Programmable Read-Only Memory), a flash memory and a hard drive. The computer program product 908 comprises a computer program 910, which comprises code means, which when executed in the processing unit 906 in the arrangement in the second communication device 900 causes the arrangement in the second communication device 900 to perform the actions e.g. of the procedure described earlier in conjunction with FIGS. 2*a* and 2*b*.

The computer program 910 may be configured as a computer program code structured in computer program modules 910*a*-910*e*. Hence, in an exemplifying embodiment, the code means in the computer program of the arrangement in the second communication device 900 comprises a transmitting unit, or module, for transmitting a first transmission to the first communication device. The computer program further comprises a receiving unit, or module, for receiving an RS configuration from the first communication device. The transmitting and receiving unit, or module, further use the received RS configuration for communicating with the first communication device.

Figure 2B:
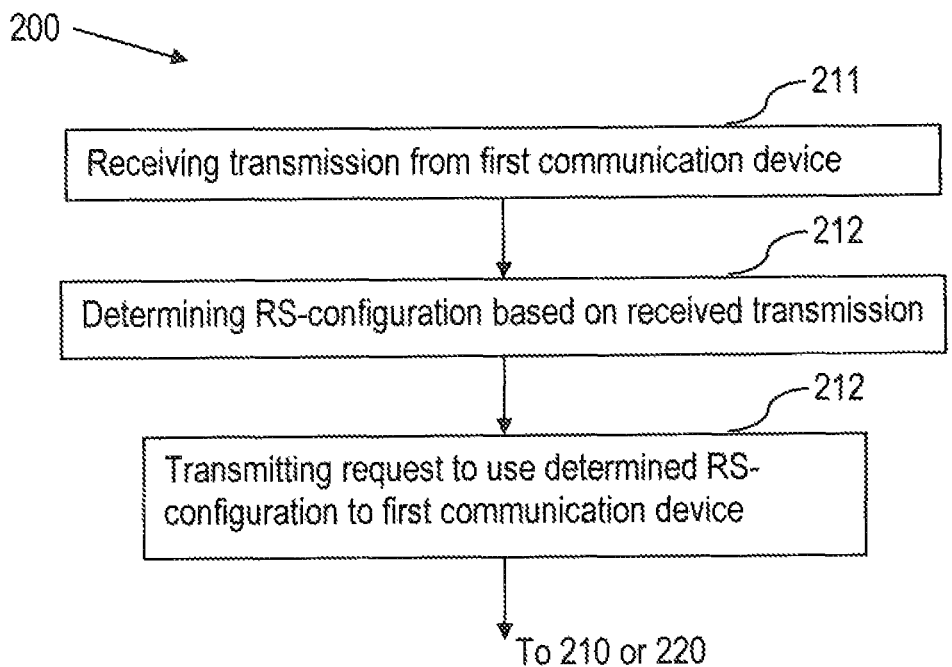
FIG. 2b is a flowchart of a method performed by a second communication device for communicating with a first communication device according to still an exemplifying embodiment.

The computer program modules could essentially perform the actions of the flow illustrated in FIGS. 2*a* and 2*b*, to emulate the arrangement in the second communication device 900. In other words, when the different computer program modules are executed in the processing unit 906, they may correspond to the units 614-616 of FIG. 6.

Although the code means in the respective embodiments disclosed above in conjunction with FIGS. 5 and 6 are implemented as computer program modules which when executed in the respective processing unit causes the first and second communication devices respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the Network Node and the UE respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first communication device for communicating via radio with a second communication device, the method comprising:
   transmitting a first transmission to the second communication device, enabling the second communication device to determine a Reference Signal (RS) configuration suitable for use for communication between the first communication device and the second communication device;
   receiving a request to use the RS configuration from the second communication device;
   receiving a second transmission from a Radio Base Station (RBS), the received second transmission comprising information regarding one of the second communication device and the RBS;
   determining an RS configuration based on the received request and the information comprised in the received second transmission; and
   transmitting the determined RS configuration to the second communication device, the determined RS configuration enabling communication between the first communication device and the second communication device.

2. The method according to claim 1, wherein determining the RS configuration comprises estimating a channel characteristic based on the received request and selecting the RS configuration based on the estimated channel characteristic.

3. The method according to claim 1, wherein determining the RS configuration comprises selecting one predefined RS configuration out of at least two predefined RS configurations comprised in the received request.

4. The method according to claim 1, wherein determining the RS configuration further is based on one of parameters specific for the second communication device and parameters specific for the operation of the second communication device.

5. The method according to claim 1, wherein transmitting the determined RS configuration to the second communication device comprises transmitting an index identifying the determined RS configuration in an RS book comprised in both the first communication device and the second communication device.

6. A method performed by a second communication device for communicating via radio with a first communication device, the method comprising:
   receiving a first transmission from the first communication device;
   determining at least one predefined Reference Signal (RS) configuration based on the received first transmission;
   transmitting, to the first communication device, a request to use an RS configuration out of the determined at least one predefined RS configuration for communication with the first communication device;
   receiving an RS configuration determined by the first communication device, wherein the determination of the received RS configuration is based on the transmitted request, transmitted to the first communication device by the second communication device and information comprised in a second transmission transmitted to the first communication device by a Radio Base Station (RBS), and wherein the information comprised in the second transmission corresponds to one of the second communication device and the RBS; and
   using the received RS configuration for communication with the first communication device.

7. The method according to claim 6, wherein determining the at least one RS configuration comprises estimating a channel characteristic based on the received first transmission and selecting the at least one predefined RS configuration out of at least two predefined RS configurations, comprised in the transmitted request, based on the estimated channel characteristic.

8. The method according to claim 6, wherein transmitting the request to use the RS configuration out of the determined at least one predefined RS configuration to the first communication device comprises transmitting an index identifying the RS configuration out of the determined at least one predefined RS configuration in an RS book comprised in both the first communication device and the second communication device.

9. A first communication device configured to communicate via radio with a second communication device, the first communication device comprising:
   a transmitting unit configured to transmit a first transmission to the second communication device, enabling the second communication device to determine a Reference Signal (RS) configuration suitable for use for communication between the first communication device and the second communication device;
   a receiving unit configured to receive a request to use the RS configuration, from the second communication device and a second transmission from a Radio Base Station (RBS), the received second transmission comprising information regarding one of the second communication device and the RBS;
   a determining unit configured to determine an RS configuration based on the received request and the information comprised in the received second transmission; and the transmitting unit further configured to transmit the determined RS configuration to the second communication device, the determined RS configuration enabling communication between the first communication device and the second communication device.

10. The first communication device according to claim 9, wherein the determining unit is configured to determine the RS configuration by estimating a channel characteristic based on the received request and selecting the RS configuration based on the estimated channel characteristic.

11. The first communication device according to claim 9, wherein the determining unit is configured to determine the RS configuration by selecting one predefined RS configuration out of at least two predefined RS configurations comprised in the received request.

12. The first communication device according to claim 9, wherein the determining unit is configured to determine the RS configuration further based on at least one of parameters specific for the second communication device and parameters specific for the operation of the second communication device.

13. The first communication device according to claim 9, wherein the transmitting unit is configured to transmit the determined RS configuration to the second communication device by transmitting an index identifying the determined RS configuration in an RS book comprised in both the first communication device and the second communication device.

14. A second communication device configured to communicate via radio with a first communication device, the second communication device comprising:
    a receiving unit configured to receive a first transmission from the first communication device;
    a determining unit configured to determine at least one predefined Reference Signal (RS) configuration based on the received first transmission;
    a transmitting unit configured to transmit to the first communication device, a request to use an RS configuration out of the determined at least one predefined RS configuration for communication with the first communication device; and
    the receiving unit further configured to receive, from the first communication device, an RS configuration determined by the first communication device, wherein the determination of the received RS configuration is based on the request transmitted to the first communication device by the second communication device and information comprised in a second transmission transmitted to the first communication device by a Radio Base Station (RBS), and wherein the information comprised in the second transmission corresponds to one of the second communication device and the RBS; and
    the second communication device being configured to use the received RS configuration, for communication with the first communication device.

15. The second communication device according to claim 14, wherein the determining unit is further configured to determine the at least one predefined RS configuration by estimating a channel characteristic based on the received first transmission and select the at least one predefined RS configuration out of at least two predefined RS configurations, comprised in the request, based on the estimated channel characteristic.

16. The second communication device according to claim 14, wherein the transmitting unit is further configured to transmit the request to use the RS configuration out of the determined at least one predefined RS configuration to the first communication device by transmitting an index identifying the RS configuration out of the determined at least one predefined RS configuration in an RS book comprised in both the first communication device and the second communication device.

* * * * *